United States Patent
Onodera

(10) Patent No.: US 10,193,739 B2
(45) Date of Patent: Jan. 29, 2019

(54) COMMUNICATION DEVICE

(71) Applicant: APRESIA SYSTEMS, LTD., Tokyo (JP)

(72) Inventor: Fumishige Onodera, Tokyo (JP)

(73) Assignee: APRESIA SYSTEMS, LTD., Tokyo (JP)

( * ) Notice: Subject to any disclaimer, the term of this patent is extended or adjusted under 35 U.S.C. 154(b) by 137 days.

(21) Appl. No.: 15/284,104

(22) Filed: Oct. 3, 2016

(65) Prior Publication Data

US 2017/0257256 A1    Sep. 7, 2017

(30) Foreign Application Priority Data

Mar. 7, 2016 (JP) .................................. 2016-043453

(51) Int. Cl.
| G06F 15/173 | (2006.01) |
| H04L 12/24 | (2006.01) |
| H04L 29/08 | (2006.01) |
| H04L 29/06 | (2006.01) |

(52) U.S. Cl.
CPC ........ *H04L 41/044* (2013.01); *H04L 41/0803* (2013.01); *H04L 67/34* (2013.01); *H04L 67/02* (2013.01); *H04L 67/42* (2013.01)

(58) Field of Classification Search
CPC ....... H04L 41/044; H04L 67/02; H04L 67/42; H04L 67/34
USPC ....................................................... 709/223
See application file for complete search history.

(56) References Cited

U.S. PATENT DOCUMENTS

| 2002/0078224 A1* | 6/2002 | Brueckner | H04L 12/43 709/233 |
| 2011/0153841 A1 | 6/2011 | Yoshida | |
| 2013/0125126 A1* | 5/2013 | Yokota | G06F 9/48 718/102 |
| 2015/0207793 A1* | 7/2015 | Mohamed | H04L 63/166 726/6 |
| 2016/0006668 A1* | 1/2016 | Shibayama | H04L 47/78 709/226 |

FOREIGN PATENT DOCUMENTS

JP       2010056835 A    3/2010

* cited by examiner

*Primary Examiner* — Wing F Chan
*Assistant Examiner* — Joseph R Maniwang
(74) *Attorney, Agent, or Firm* — David D. Brush; Westman, Champlin & Koehler, P.A.

(57) ABSTRACT

Provided is a communication device that includes a plurality of ports, through which a frame is transmitted and received, and that forms a network together with at least one adjacent device connected via at least one port among the plurality of ports. The communication device includes an information acquisition unit that acquires information on the at least one adjacent device; a setting execution unit that executes, upon receipt of a setting command specified in advance, a setting processing for changing a setting of the communication device in accordance with the setting command; and a propagation execution unit that executes a propagation processing for transferring the setting command to the at least one adjacent device.

16 Claims, 5 Drawing Sheets

COMMUNICATION DEVICE

CROSS-REFERENCE TO RELATED APPLICATIONS

This application claims the benefit of Japanese Patent Application No. 2016-043453 filed on Mar. 7, 2016 with the Japan Patent Office, the disclosure of which is incorporated herein by reference.

BACKGROUND

The present disclosure relates to a technique of performing a setting change of a network device.

As a technique of performing a setting change of a plurality of communication devices on a network, Japanese Unexamined Patent Application Publication No. 2010-056835 describes a following technique. Specifically, the technique involves connecting a management terminal to an RS-232C port provided to a communication device whose setting is to be changed (hereinafter referred to as a target device) among a plurality of communication devices, or establishing a TELNET connection from a management terminal connected to the network to the target device, and issuing a command to perform a setting change from the management terminal.

SUMMARY

However, in the above-described technique, it is necessary to repeat similar operations for the respective target devices, and thus, the quantity of operations is increased as the number of the target devices is increased, which is a problem. Another problem is that human errors such as an improper input may occur because the command needs to be issued manually in the management terminal.

Also known as another technique is to issue a command to perform a setting change to the respective target devices by using a provisioning function of network management software. To use the provisioning function, however, it is necessary to introduce the network management software, and thus, a problem arises in that a higher operation cost may be incurred.

One aspect of the present disclosure preferably provides a technique of reducing the time and effort at the time of a setting change of the network devices and of inhibiting errors caused in the setting.

One embodiment of the present disclosure is a communication device that includes a plurality of ports, through which a frame is transmitted and received, and that forms a network together with at least one adjacent device connected via at least one port among the plurality of ports. The communication device comprises an information acquisition unit, a setting execution unit, and a propagation execution unit.

The information acquisition unit acquires information on the at least one adjacent device. The setting execution unit executes, upon receipt of a setting command specified in advance, a setting processing for changing a setting of the communication device in accordance with the setting command. The propagation execution unit executes a propagation processing for transferring the setting command to the at least one adjacent device.

In the network formed by a plurality of such communication devices, it is not necessary to perform settings of the respective communication devices individually, and thus, the time and effort at the time of a setting change can be reduced and errors caused in the setting can be inhibited.

BRIEF DESCRIPTION OF THE DRAWINGS

Example embodiments of the present disclosure will now be described with reference to the accompanying drawings, in which.

DETAILED DESCRIPTION OF THE PREFERRED EMBODIMENTS

1. Overall Configuration

A communication device 1 of the present embodiment is a box-type switching device that functions as a so-called layer-2 switch that performs a relay processing of a layer-2 on the basis of Open Systems Interconnection (OSI). The communication device 1 forms a network together with a plurality of devices configured similarly. Although an explanation is given herein with an example in which the communication device 1 is the box-type switching device, the communication device 1 is not limited to this and may be a chassis-type switching device. Further, the box-type switching device is not limited to one that functions as the layer-2 switch, and may be one that functions as a layer-3 switch.

Figure 1:
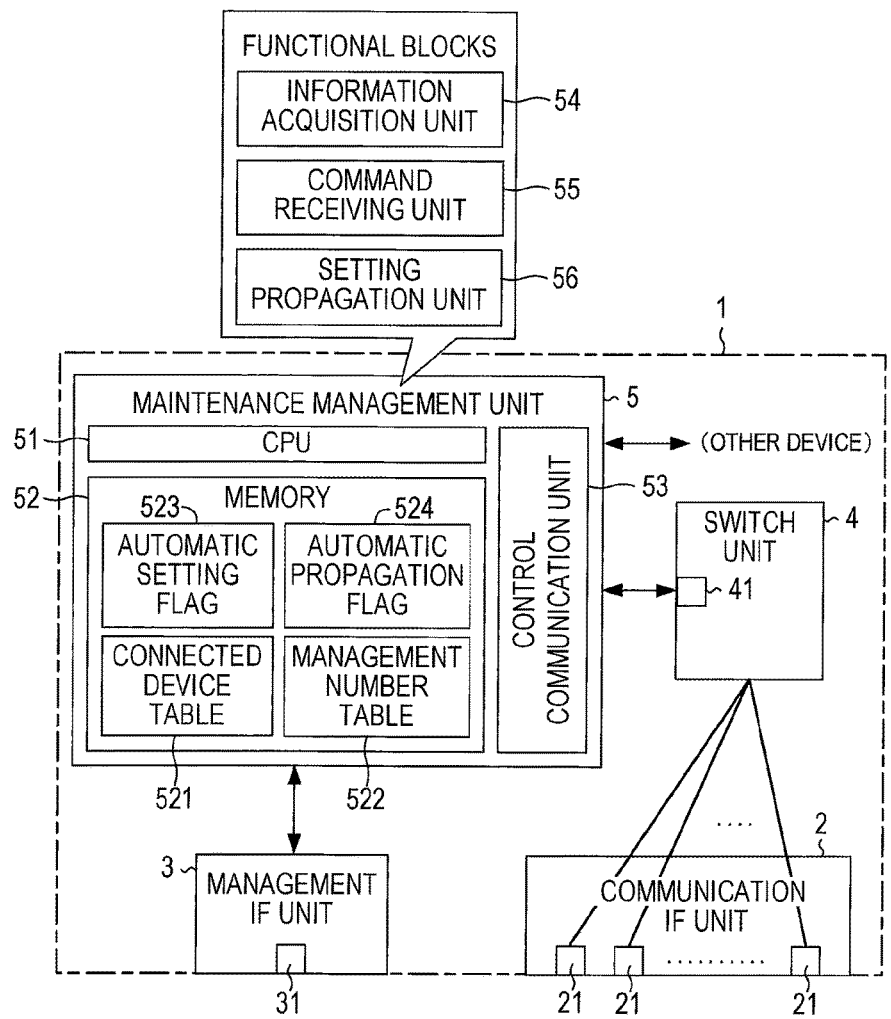
FIG. 1 is a block diagram showing a configuration of a communication device.

As shown in FIG. 1, the communication device 1 comprises a communication interface unit (hereinafter referred to as a communication IF unit) 2, a management interface unit (hereinafter referred to as a management IF unit) 3, a switch unit 4, and a maintenance management unit 5.

The communication IF unit 2 comprises a plurality of communication ports 21 that provide a 1 Gbps or 10 Gbps Ethernet (registered trademark) interface conforming to IEEE 802.3 standard. Connected to the plurality of communication ports 21 are other communication devices configured similarly to the communication device 1 and/or other communication terminals. The communication terminals each include at least a personal computer (hereinafter referred to as a management terminal) that performs a setting change, etc., of the communication device 1.

The management IF unit 3 at least comprises a management port 31 conforming to RS-232C standard. Connected to the management port 31 as necessary is the management terminal or the like.

The switch unit 4 is a switching device that provides a switching function, i.e., a function of relaying an Ethernet frame transmitted and received via each communication port 21 of the communication IF unit 2. Further, the switch unit 4 comprises a control communication unit 41 that performs a serial communication with the maintenance management unit 5. In addition to the above-described switching function, the switch unit 4 has a function of performing various settings of the switch unit 4 itself and transmission and receipt of a management frame via the communication port 21, in accordance with a command from the maintenance management unit 5 received via the control communication unit 41. The management frame refers to a frame other than a data frame transmitted and received between the communication terminals connected to the network.

Figure 2:
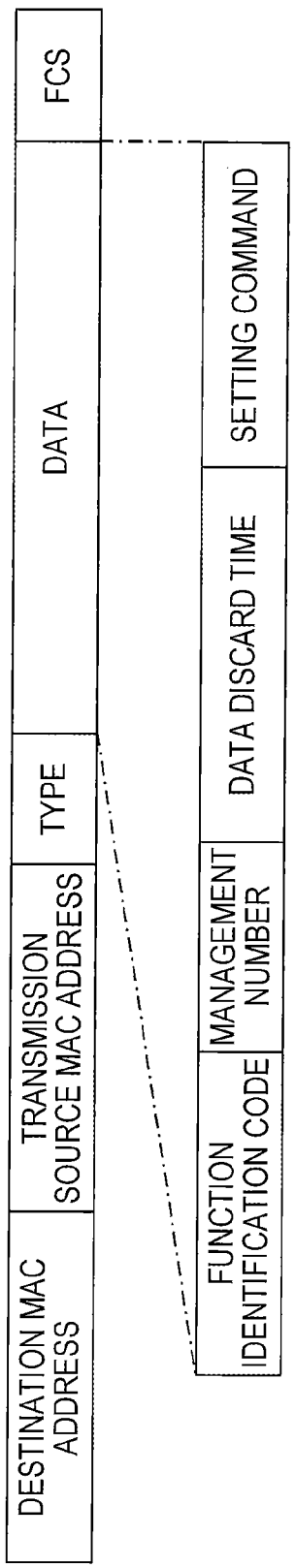
FIG. 2 is an explanatory diagram showing a configuration of a propagation frame.

Here, an explanation will be given about a propagation frame, which is a kind of the management frame. As shown in FIG. 2, the propagation frame is an Ethernet frame that contains, in a data area thereof, a function identification code, a management number, a data discard time, and a setting command. The function identification code is used to identify a function for which the propagation frame is to be used. Here, a code is assigned that indicates that this propagation frame relates to an automatic setting function to be described later. The management number is a serial number updated each time the propagation frame is generated. The data discard time is a time obtained by adding a continuation allowed time set in advance to a clock time when the propagation frame is generated. The setting command indicates a specific setting.

The maintenance management unit 5 is mainly configured with a known microcomputer including a CPU 51, a RAM, a ROM, and a semiconductor memory (hereinafter referred to as a memory 52) such as a flash memory. Further, the maintenance management unit 5 comprises a control communication unit 53 that performs a serial communication with each device constituting the communication device 1, and performs various controls regarding setting, monitoring, etc., of each device via a serial communication network formed together with each device corresponding to the serial communication. The maintenance management unit 5 is configured to be able to receive a command and so on from the management terminal, etc., connected via the management IF unit 3. Various functions of the maintenance management unit 5 are performed when the CPU 51 executes programs stored in the memory 52. The number of the microcomputer constituting the maintenance management unit 5 may be one or more.

The various functions of the maintenance management unit 5 are performed when the CPU 51 executes the programs. Functional blocks of the various functions include an information acquisition unit 54, a command receiving unit 55, and a setting propagation unit 56. Further, the maintenance management unit 5 has a function of performing existing various management protocols such as Teletype network (TELNET), Simple Network Management Protocol (SNMP), and Link Layer Discovery Protocol (LLDP). TELNET is a known protocol for remotely controlling a device connected to a network via a TCP/IP network. SNMP is a known protocol for monitoring and controlling, via a network, a device connected to a TCP/IP network. LLDP is a known protocol prepared to notify a device connected to the communication port 21 (hereinafter referred to as an adjacent device) of information on the communication device 1 (hereinafter referred to as device information).

A technique of embodying these elements constituting the maintenance management unit 5 is not limited to software, and some or all of the elements may be embodied by using hardware, which is a combination of a logic circuit, an analog circuit, and so on.

In addition to the above-described programs that perform the various functions, the memory 52 stores at least a connected device table 521, a management number table 522, an automatic setting flag 523, and an automatic propagation flag 524. The memory 52 corresponds to one example of a propagation information storage unit and a setting information storage unit.

The connected device table 521 is information generated by processing by the information acquisition unit 54, details of which will be described later.

The management number table 522 stores the management number indicated in the propagation frame. This information inhibits the setting commands of the propagation frames assigned with the same management number from being processed redundantly. The automatic setting flag 523 is information indicating whether a setting processing in accordance with the setting command is to be enabled or disabled. The automatic propagation flag 524 is information indicating whether a transfer processing that transfers the setting command is to be enabled or disabled. The automatic setting flag 523 and the automatic propagation flag 524 are set in advance individually for each communication device 1 by using a function of TELNET or SNMP, or via the management IF unit 3. The automatic setting flag 523 and the automatic propagation flag 524 both indicate enablement when they are ON, and indicate disablement when they are OFF.

An explanation will now be given about each function performed by the maintenance management unit 5.

The information acquisition unit 54 acquires the device information on the adjacent device by LLDP, and generates the connected device table 521 in the memory 52. The connected device table 521 stores the device information on the adjacent device acquired by the information acquisition unit 54 in association with a port number of the corresponding communication port 21 from among the plurality of communication ports 21 of the communication device 1. The device information specifically includes: an MAC address of the adjacent device, the port number of a connection port of the adjacent device, an expiration date of the acquired information, an interface name of the adjacent device, an SNMP system name of the adjacent device, a name and an operation version of the adjacent device, a management IP of the adjacent device, and so on.

Upon receipt of the setting command issued by the management terminal, the command receiving unit 55 performs a setting of the communication device 1 in accordance with the setting command if the automatic setting flag 523 is set to ON. Further, if the automatic propagation flag 524 is set to ON, the communication device 1 propagates the setting command to the adjacent device using the propagation frame. The communication device 1 that receives the setting command issued by the management terminal is hereinafter referred to as a representative device. The representative device receives the setting command from the management terminal connected to the management port 31 of the communication device 1 or from the management terminal connected to the network. Especially in the latter case, a TELNET connection is employed.

2. Setting Propagation Processing

Figure 3:
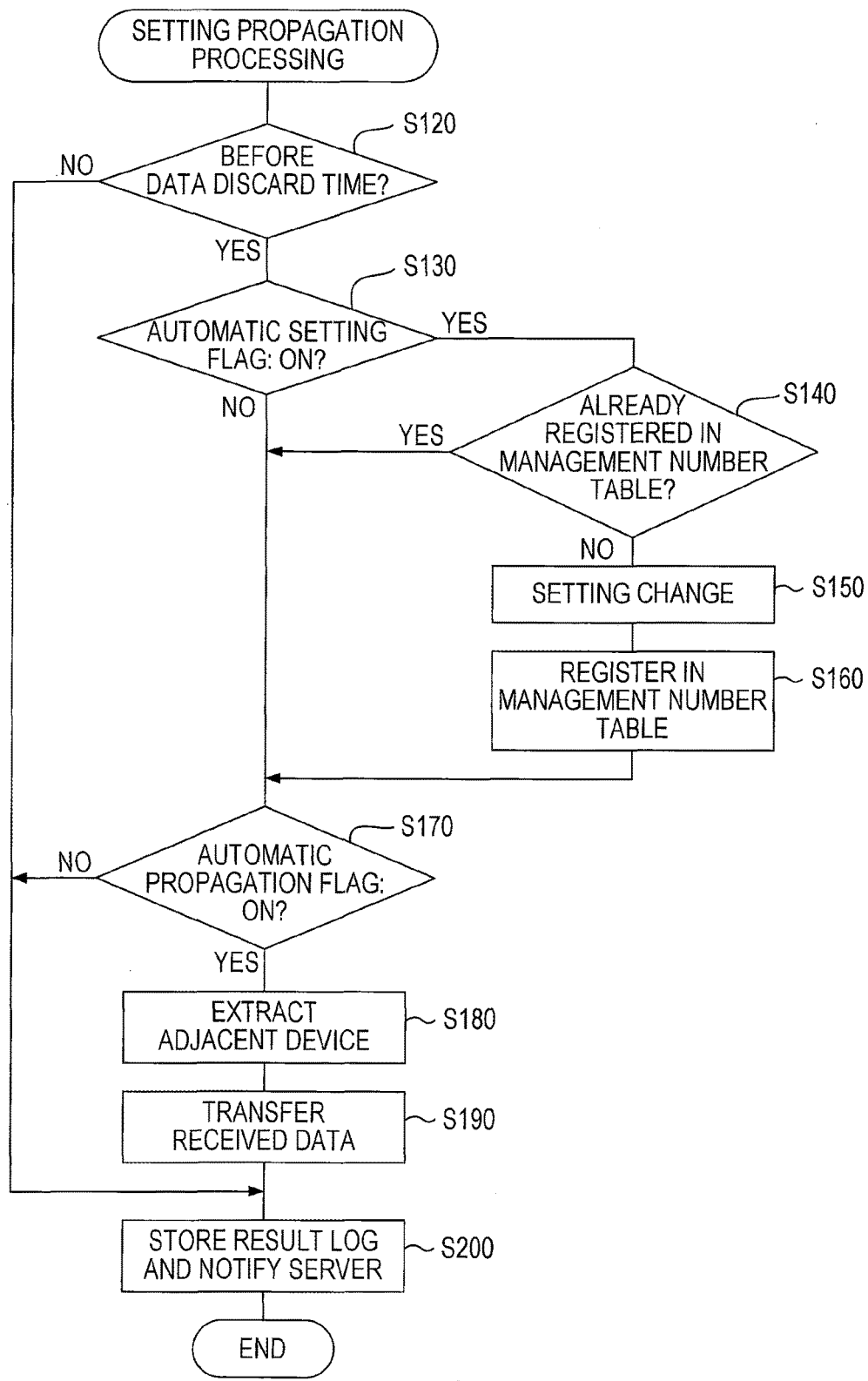
FIG. 3 is a flowchart of a setting propagation processing.

Here, an explanation will be given about details of a setting propagation processing, which is a processing executed by the setting propagation unit 56, with reference to a flowchart shown in FIG. 3.

This processing is activated when the propagation frame is received via any of the plurality of communication ports 21. Specifically, this processing is activated when the Ethernet frame is received in which an MAC address of the communication device 1 is set as a destination MAC address and an MAC address of the adjacent device that has transmitted the propagation frame is set as a transmission source MAC address and in which the function identification code in the data area is set to a code indicating a setting propagation function.

When this processing is activated, in S120, the CPU 51 in the maintenance management unit 5 first compares the data discard time in the received propagation frame (hereinafter referred to as a received frame) with a current time in the communication device 1 and determines whether the current time is before the data discard time. If the current time is past the data discard time, the received frame is discarded and the processing proceeds to S200. If the current time is before the data discard time, the processing proceeds to S130.

In S130, it is determined whether the automatic setting flag 523 is ON. If the automatic setting flag 523 is OFF, the processing proceeds to S170. If the automatic setting flag 523 is ON, the processing proceeds to S140.

In S140, it is determined whether the management number indicated in the received frame has already been registered in the management number table 522. If the management number has already been registered, the setting command indicated in the received frame is deemed to have been processed, and the processing proceeds to S170. If the management number has not been registered yet, the processing proceeds to S150.

In S150, the setting processing is executed in accordance with the setting command indicated in the received frame. This processing corresponds to one example of a setting execution unit.

In S160, the management number indicated in the received frame is registered in the management number table 522.

In S170, it is determined whether the automatic propagation flag 524 is ON. If the automatic propagation flag 524 is OFF, the received frame is discarded, and the processing proceeds to S200. If the automatic propagation flag 524 is ON, the processing proceeds to S180.

In S180, other adjacent device except for the adjacent device that has transmitted the received frame is extracted with reference to the connected device table 521.

In S190, the received frame (i.e., the propagation frame) is transferred to the other adjacent device extracted in S180. When the received frame is transferred, information in the data area is maintained without being rewritten, and only the destination MAC address and the transmission source MAC address are rewritten.

In S200, a log indicating a processing result of the received frame is stored in the memory 52, and a monitoring server connected to the network is notified of the processing result using a function of SNMP (e.g., a syslog command and a trap command), to thereby terminate the setting propagation processing. This processing corresponds to one example of a result notification unit.

3. Operation Example

Figure 4:
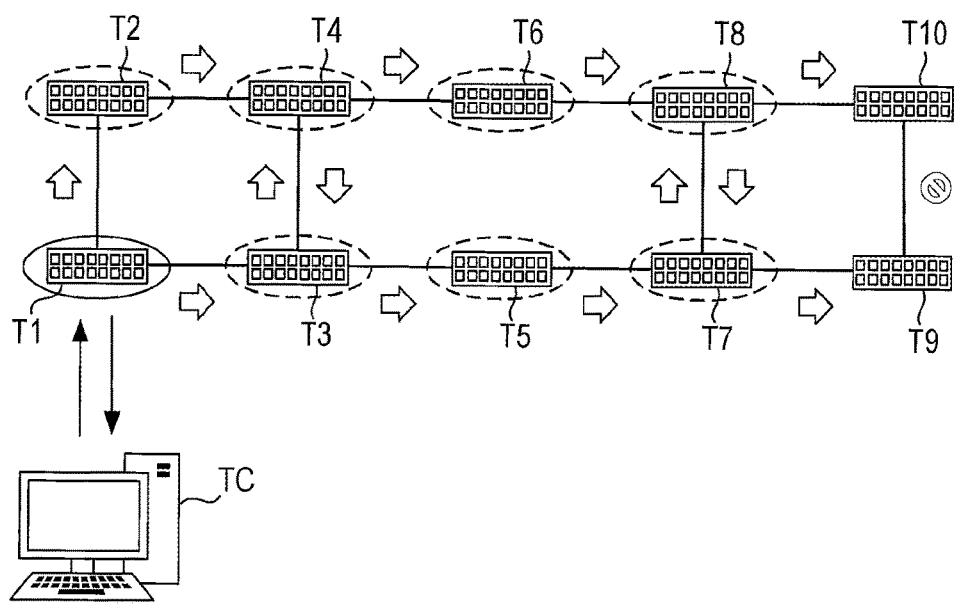
FIG. 4 is an explanatory diagram showing an operation example.

The network formed by ten communication devices 1 (hereinafter referred to as T1 to T10) is shown here in FIG. 4 as an example. In the drawing, the communication device T1 circled by a solid-line ellipse is the representative device. In the communication devices T2 to T8 each circled by a dotted-line ellipse, the respective automatic propagation flags 524 are set to ON. In all of the communication devices T1 to T10, the respective automatic setting flags 523 are set to ON. Further, the communication devices T1 to T10 are each in a state where the connected device table 521 is set by LLDP, i.e., in a state of being aware of which communication device is connected to the corresponding communication port 21.

When the setting command is issued from a management terminal TC to the representative device T1, the representative device T1 executes the setting processing based on the setting command, generates the propagation frames, and transmits the propagation frames to the adjacent communication devices T2 and T3. Then, the representative device T1 executes a notification processing to notify the not-shown monitoring server of the processing result.

The communication devices T2 and T3, each of which has received the propagation frame from the representative device T1, each execute the setting processing based on the setting command, and transfers the propagation frame to the adjacent communication device other than the communication device that has transmitted the propagation frame (the representative device T1). That is, the communication device T2 transfers the propagation frame to the communication device T4, and the communication device T3 transfers the propagation frames to the communication devices T4 and T5. Then, the communication devices T2 and T3 each execute the notification processing.

The communication device T4 receives the propagation frames from the communication devices T2 and T3, and executes the setting processing, the transfer processing, and the notification processing similarly to the above, for the propagation frame received earlier. As for the propagation frame received later, the management number indicated in the propagation frame has already been registered in the management number table 522, and thus, the setting processing is not executed, and the transfer processing and the notification processing are executed.

The communication device T3 receives the propagation frames from the communication devices T1 and T4, and executes the processings similarly to the communication device T4.

The communication devices T5 to T8 each execute the processings similarly to the communication devices T2 to T4.

The communication devices T9 and T10, in which the respective automatic propagation flags 524 are set to OFF, each execute the setting processing and the notification processing in accordance with the propagation frame received from the adjacent communication devices T7 and T8, respectively, and do not execute the transfer processing.

In this way, all of the communication devices T1 to T10 each execute the setting processing based on the setting command. Although the propagation frame is looped in some cases, such a propagation frame is registered in the management number table 522, and thus, the setting processing is not executed redundantly, and the propagation frame is discarded automatically when the data discard time has passed.

4. Effects

With the embodiment detailed above, the following effects can be obtained.

(1) In the network formed by the communication devices 1, the setting command is propagated automatically, and thus, all of the communication devices 1 connected to the network can be set to desired settings automatically only by issuance of the setting command from the management terminal TC to the representative device T1. Consequently, it is not necessary to perform settings of the respective communication devices 1 individually, and thus, the time and effort at the time of a setting change can be reduced and errors caused in the setting can be inhibited.

(2) Each communication device 1 notifies the external monitoring server of the result of the processings based on the setting command by using the function of SNMP. Thus, an administrator of the network who has performed the setting change can easily grasp progress of the settings using the setting propagation function, i.e., to what extent the settings have been completed, by accessing the monitoring server.

5. Other Embodiments

Although the example embodiment of the present disclosure has been described above, the present disclosure is not limited to the above-described embodiment and can be implemented in various modified forms.

Figure 5:
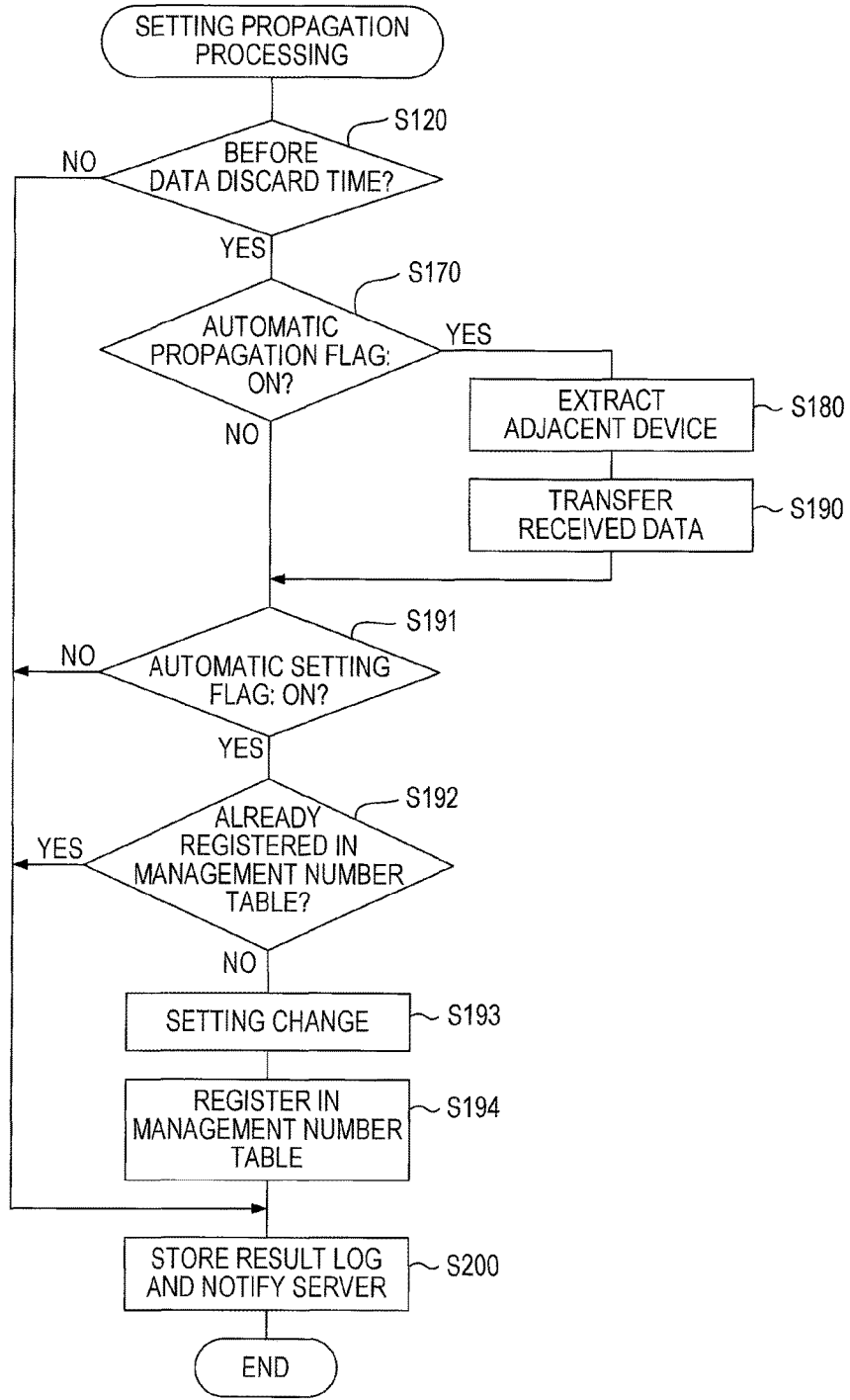
FIG. 5 is a flowchart showing a modified example of the setting propagation processing.

(A) In the above-described embodiment, in the setting propagation processing, the automatic setting function (S130 to S160) is processed first, and an automatic propagation function (S170 to S190) is processed later. However, as shown in FIG. 5, the setting propagation processing may be configured such that the automatic propagation function (S170 to S190) is processed first and the automatic setting function (S191 to S194) is processed later. The processings in S191 to S194 are similar to those in S130 to S160. In the former case, in which the automatic setting function is prioritized, occurrence of useless traffic can be inhibited as compared with the latter case, in which the automatic propagation function is prioritized. In the latter case, in which the automatic propagation function is prioritized, a processing time required for the automatic setting in the entire network can be shortened as compared with the former case, in which the automatic setting function is prioritized, and such an effect can be enhanced as a network scale is larger and the number of the devices to be set is larger.

(B) In the above-described embodiment, a unique protocol, which is an extension of the Ethernet frame, is used to transfer the propagation frame. However, this is not the only protocol used, and an extension of an existing protocol such as LLDP may be used.

(C) A plurality of functions of one component in the above-described embodiment may be performed by a plurality of components, and one function of one component may be performed by a plurality of components. Further, a plurality of functions of a plurality of components may be performed by one component, and one function performed by a plurality of components may be performed by one component. Part of the configuration in the above-described embodiment may be omitted. Alternatively, at least part of the configuration in the above-described embodiment may be added to any of other configurations in the above-described embodiments or substituted by part of any of the other configurations. It is to be noted that any and all embodiments encompassed in technological concepts specified by the claim language are embodiments of the present disclosure.

(D) Other than the above-described communication device, the present disclosure also can be embodied in various forms, such as a system including the communication device as a component, a setting propagation method, and a setting propagation program.

What is claimed is:

1. A communication device that includes a plurality of ports, through which a frame is transmitted and received, and that forms a network together with at least one adjacent device connected via at least one port among the plurality of ports, the communication device comprising:
an information acquisition circuit that acquires information on the at least one adjacent device;
a setting execution circuit that executes, upon receipt of a setting command specified in advance, a setting processing for changing a setting of the communication device in accordance with the setting command;
a propagation execution circuit that executes a propagation processing for transferring the setting command to the at least one adjacent device;
a propagation information storage that stores an automatic propagation flag indicating that the propagation processing is enabled or disabled, wherein the propagation execution circuit executes the propagation processing when the automatic propagation flag indicates that the propagation processing is enabled; and
a setting information storage that stores an automatic setting flag indicating that the setting processing is enabled or disabled, wherein the setting execution circuit executes the setting processing when the automatic setting flag indicates that the setting processing is enabled.

2. The communication device according to claim 1, further comprising a result notification circuit that notifies a monitoring server connected to the network of a processing result by the setting execution circuit.

3. The communication device according to claim 1, further comprising a command receiving circuit that receives the setting command from an external device other than the at least one adjacent device.

4. The communication device according to claim 1, wherein the information acquisition circuit acquires information on the at least one adjacent device by using a link layer discovery protocol.

5. The communication device according to claim 1, wherein the frame contains a management number, wherein the communication device comprises a management number table that stores the management number indicated in the frame, and wherein when the frame is received and when the management number indicated in the received frame has been registered in the management number table, the setting execution circuit does not execute the setting processing based on the setting command indicated in the received frame.

6. The communication device according to claim 1, wherein when the propagation execution circuit transmits the received frame to an adjacent device, the communication device rewrites a destination MAC address contained in the frame to a MAC address of the adjacent device, to which the frame is to be transmitted, and the communication device rewrites a transmission source MAC address contained in the frame to a MAC address of the communication device.

7. The communication device according to claim 1, further comprising:
a connected device table that stores device information on an adjacent device and a port number, to which the adjacent device is connected,
wherein the propagation execution circuit selects an adjacent device other than another adjacent device, which transmitted the frame to the communication device, with reference to the connected device table and transmits the frame to the selected adjacent device.

8. The communication device according to claim 1, wherein the frame contains a data discard time, and wherein when the communication device receives the frame, the communication device compares the data discard time in the received frame with a current time in the communication device and discards the received frame if the current time is past the data discard time.

9. A communication device that includes a plurality of ports, through which a frame is transmitted and received, and that forms a network together with at least one adjacent device connected via at least one port among the plurality of ports, the communication device comprising:
a processor; and
a non-transitory computer-readable medium comprising instructions stored thereon, which when executed by the processor configure the communication device to perform acts comprising:
acquiring information on the at least one adjacent device;
executing, upon receipt of a setting command specified in advance, a setting processing for changing a setting of the communication device in accordance with the setting command;
executing a propagation processing for transferring the setting command to the at least one adjacent device;
storing an automatic propagation flag indicating that the propagation processing is enabled or disabled, wherein the communication device executes the propagation processing when the automatic propagation flag indicates that the propagation processing is enabled; and
storing an automatic setting flag indicating that the setting processing is enabled or disabled, wherein the communication device executes the setting processing when the automatic setting flag indicates that the setting processing is enabled.

10. The communication device according to claim 9, wherein the instructions further configure the communication device to notify a monitoring server connected to the network of a processing result by the setting processing.

11. The communication device according to claim 9, wherein the instructions further configure the communication device to receive the setting command from an external device other than the at least one adjacent device.

12. The communication device according to claim 9, wherein the instructions further configure the communication device to acquire the information on the at least one adjacent device by using a link layer discovery protocol.

13. The communication device according to claim 9, wherein the frame contains a management number, wherein the communication device comprises a management number table that stores the management number indicated in the frame, and
wherein the instructions further configure the communication device to, when the frame is received and when the management number indicated in the received frame has been registered in the management number table, not execute the setting processing based on the setting command indicated in the received frame.

14. The communication device according to claim 9, wherein the instructions further configure the communication device to, when the propagation execution circuit transmits the received frame to an adjacent device, rewrite a destination MAC address contained in the frame to a MAC address of the adjacent device, to which the frame is to be transmitted, and rewrite a transmission source MAC address contained in the frame to a MAC address of the communication device.

15. The communication device according to claim 9, further comprising:
a connected device table that stores device information on an adjacent device and a port number, to which the adjacent device is connected,
wherein the instructions further configure the communication device to select an adjacent device other than another adjacent device, which transmitted the frame to the communication device, with reference to the connected device table and transmit the frame to the selected adjacent device.

16. The communication device according to claim 9, wherein the frame contains a data discard time, and
wherein the instructions further configure the communication device to, when the communication device receives the frame, compare the data discard time in the received frame with a current time in the communication device and discard the received frame if the current time is past the data discard time.

* * * * *